US010654487B2

(12) United States Patent
Kishi et al.

(10) Patent No.: US 10,654,487 B2
(45) Date of Patent: May 19, 2020

(54) TRAVEL CONTROL APPARATUS OF SELF-DRIVING VEHICLE

(71) Applicant: Honda Motor Co., Ltd., Tokyo (JP)

(72) Inventors: Takayuki Kishi, Wako (JP); Toshiyuki Mizuno, Wako (JP); Akira Kito, Wako (JP); Yoshiaki Konishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/175,738

(22) Filed: Oct. 30, 2018

(65) Prior Publication Data

US 2019/0135302 A1     May 9, 2019

(51) Int. Cl.
*B60W 30/18*     (2012.01)
*B60W 50/08*     (2020.01)
*G05D 1/00*     (2006.01)
*B60W 30/16*     (2020.01)

(52) U.S. Cl.
CPC ............ *B60W 50/08* (2013.01); *B60W 30/16* (2013.01); *G05D 1/0088* (2013.01); *B60W 2554/801* (2020.02); *B60W 2754/50* (2020.02); *B60W 2900/00* (2013.01)

(58) Field of Classification Search
USPC ...................................................... 701/102
See application file for complete search history.

(56) References Cited

U.S. PATENT DOCUMENTS

| 9,114,810 | B2 * | 8/2015 | Sudou ........................ G01S 1/02 |
| 2017/0287233 | A1 * | 10/2017 | Nix .......................... G07C 5/008 |
| 2018/0052463 | A1 * | 2/2018 | Mays ....................... B60T 17/18 |
| 2018/0326994 | A1 * | 11/2018 | Sakai ................... G05D 1/0061 |
| 2019/0001976 | A1 * | 1/2019 | Liu ......................... B60W 30/16 |

FOREIGN PATENT DOCUMENTS

| JP | 2009205635 A | 9/2009 |
| JP | 2013203380 A | 10/2013 |

* cited by examiner

*Primary Examiner* — Masud Ahmed
(74) *Attorney, Agent, or Firm* — Duft & Bornsen, PC

(57) ABSTRACT

A travel control apparatus including a driving level switching portion switching to a first driving automation level involving a driver responsibility to monitor surroundings or a second driving automation level not involving the driver responsibility to monitor the surroundings, a distance measurement device measuring an inter-vehicle distance to a forward vehicle, and a microprocessor. The microprocessor performs controlling an equipment according to the inter-vehicle distance so as to follow the forward vehicle, controlling the equipment so that the self-driving vehicle starts when the inter-vehicle distance increases up to a predetermined value, and determining a first predetermined value as the predetermined value when the driving automation level is switched to the first driving automation level and a second predetermined value larger than the first predetermined value as the predetermined value when the driving automation level is switched to the second driving automation level.

9 Claims, 10 Drawing Sheets

*FIG. 15*

|  |  | MANUAL DRIVING | SELF LV1 | SELF LV2 | SELF LV3 & UP |
|---|---|---|---|---|---|
| CREEP FORCE | DURING STOPPING (WEAK CREEP FORCE) | ○ | ○ | × | × |
| | DURING TRAVELING (STRONG CREEP FORCE) | ○ | ○ | ○ | × |
| START TIMING | | ARBITRARY | FAITHFULLY VEHICLE-FOLLOWING | SMALL INTER-VEHICLE DISTANCE | LARGE INTER-VEHICLE DISTANCE |
| START G[FORWARD VEHICLE : G0(<G2<G1)] | | G0 | G0 | G2 | G1 |
| TARGET VEHICLE SPEED [FORWARD VEHICLE : Va1(>V2>V1)] | | Va1 | Va1 | V2 | V1 |
| CLUTCH ON-OFF VERY LOW SPEED TRAVELING | | × | × | × | ○ |

TRAVEL CONTROL APPARATUS OF SELF-DRIVING VEHICLE

CROSS-REFERENCE TO RELATED APPLICATION

This application is based upon and claims the benefit of priority from Japanese Patent Application No. 2017-213805 filed on Nov. 6, 2017, the content of which is incorporated herein by reference.

BACKGROUND OF THE INVENTION

Field of the Invention

This invention relates to a travel control apparatus of a self-driving vehicle.

Description of the Related Art

Conventionally, there is a known apparatus of this type, configured to determine congestion and other traffic conditions based on acceleration of a forward vehicle when the forward vehicle starts running and control driving of a brake pedal and an accelerator pedal so as follow the forward vehicle in a manner compatible with traffic conditions. Such an apparatus is described in Japanese Unexamined Patent Publication No. 2009-205635 (JP2009-205635A), for example.

However, in the apparatus disclosed in JP2009-205635A, when a subject vehicle follows the forward vehicle that repeatedly starts and stops owing to traffic congestion or the like, the subject vehicle also repeatedly starts and stops. As a result, the subject vehicle may experience problems with the vehicle travel owing to increased heat load on, for example, a start clutch, travel motor or other equipment that operates when the vehicle starts.

SUMMARY OF THE INVENTION

An aspect of the present invention is a travel control apparatus of a self-driving vehicle for controlling an equipment actuated when the self-driving vehicle starts, including: a driving level switching portion configured to switch a driving automation level to a first driving automation level involving a driver responsibility to monitor surroundings during traveling or a second driving automation level not involving the driver responsibility to monitor the surroundings during traveling; a distance measurement device configured to measure an inter-vehicle distance from the self-driving vehicle to a forward vehicle; and an electric control unit including a microprocessor and a memory. The microprocessor is configured to perform: controlling the equipment in accordance with the inter-vehicle distance measured by the distance measurement device so as to follow the forward vehicle, the controlling including controlling the equipment so that the self-driving vehicle starts when the inter-vehicle distance measured by the distance measurement device increases up to a predetermined value, and the controlling including determining a first predetermined value as the predetermined value when the driving automation level is switched to the first driving automation level by the driving level switching portion and a second predetermined value larger than the first predetermined value as the predetermined value when the driving automation level is switched to the second driving automation level by the driving level switching portion.

BRIEF DESCRIPTION OF THE DRAWINGS

The objects, features, and advantages of the present invention will become clearer from the following description of embodiments in relation to the attached drawings, in which:

FIG. 15 is a diagram showing table summarizing action patterns in the travel control apparatus according to the embodiment of the invention.

DETAILED DESCRIPTION OF THE INVENTION

Figure 1:
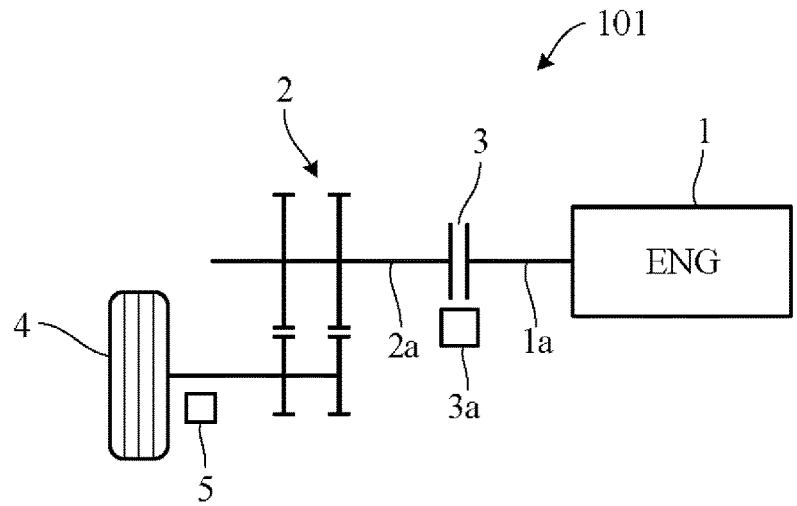
FIG. 1 is a diagram showing a configuration overview of a driving system of a self-driving vehicle incorporating a travel control apparatus according to an embodiment of the present invention.

Hereinafter, an embodiment of the present invention is explained with reference to FIGS. 1 to 15. A travel control apparatus according to an embodiment of the present invention is applied to a vehicle (self-driving vehicle) having a self-driving capability. FIG. 1 is a diagram showing a configuration overview of a driving system of a self-driving vehicle 101 incorporating a travel control apparatus according to the present embodiment. Herein, the self-driving vehicle may be sometimes called "subject vehicle" to differentiate it from other vehicles. The vehicle 101 is not limited to driving in a self-drive mode requiring no driver driving operations but is also capable of driving in a manual drive mode by driver operations.

As shown in FIG. 1, the vehicle 101 includes an engine 1, a transmission 2, a start clutch 3 and a braking device 5. The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Air intake volume is metered by the throttle valve.

The transmission 2 is, for example, a stepped transmission enabling stepwise speed ratio (gear ratio) shifting in accordance with multiple (e.g. seven) speed stages. Optionally, a continuously variable transmission enabling stepless speed ratio shifting can be used as the transmission 2. The transmission 2, which is installed in a power transmission path between the engine 1 and drive wheels 4, varies speed ratio of rotation of from the engine 1, and converts and outputs torque from the engine 1. The rotation of speed converted by the transmission 2 is transmitted to the drive wheels 4, thereby propelling the vehicle 101. Optionally, the vehicle 101 can be configured as an electric vehicle or hybrid vehicle by providing a travel motor as a drive power source in place of or in addition to the engine 1. The braking device 5 is configured as disk brake or drum brake generating a braking force in accordance with a braking pressure, and it can exert the braking force to the drive wheels 4.

The start clutch (start clutch) 3 is interposed between an output shaft 1a of the engine 1 and an input shaft 2a of the transmission 2 and operates to enable and disable transmission of torque between the engine 1 and the transmission 2. As the start clutch 3 can be used, for example, a dry single-plate or wet multi-plate friction clutch with push-type clutch disks. The start clutch 3 is driven to engage and disengage by a control valve or electric motor (for convenience termed "clutch actuator 3a") operated by electric signals, for example. Amount of engaging force of the start clutch 3 corresponds to motive power (clutch torque) transmitted between the engine 1 and the transmission 2. Therefore, the clutch torque can be adjusted by drive-controlling the clutch actuator 3a.

Disengagement of the start clutch 3 establishes a clutch OFF state of clutch torque 0 with torque transmission between the engine 1 and transmission 2 cut off. Engagement of the start clutch 3 establishes a clutch ON state of maximum clutch torque with maximum torque transmission between the engine 1 and the transmission 2. The start clutch can be switched not only to clutch OFF state and clutch ON state but also to a partially engaged condition of intermediate value clutch torque obtained by transmitting torque while slipping occurs between the engine 1 and the transmission 2.

In addition, the start clutch 3 is configured, similarly to in a vehicle equipped with a torque converter, so that torque from the engine 1 (creep force) is transmitted to the transmission 2 when engine speed is idling speed. Creep force adjustment at this time is driven by the clutch actuator 3a, and the adjustment of creep force enables the subject vehicle to creep with the accelerator pedal left unoperated. The start clutch 3 is not limited to a friction clutch but can be configured as an electromagnetic clutch or any of various types of clutch adjustable by clutch actuator 3a driving.

Figure 2:
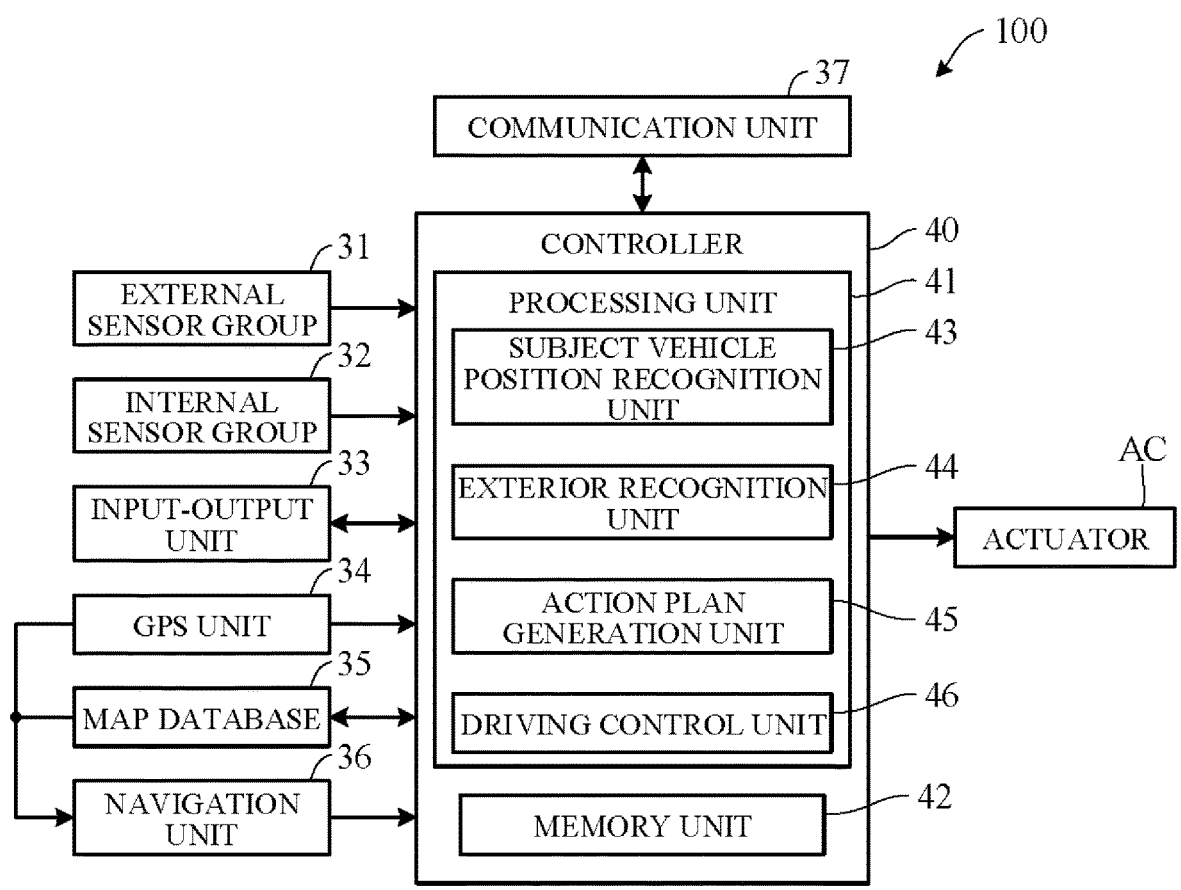
FIG. 2 is the block diagram schematically illustrating overall configuration of a travel control apparatus according to an embodiment of the present invention.

FIG. 2 is a block diagram schematically illustrating overall configuration of a travel control system 100 according to an embodiment of the present invention. As shown in FIG. 2, the travel control system 100 is configured centered on a controller 40 and includes mainly of the controller 40, and as members electrically connected thereto through CAN (Controller Area Network) communication or the like, an external sensor group 31, an internal sensor group 32, an input-output unit 33, a GPS unit 34, a map database 35, a navigation unit 36, a communication unit 37, and actuators AC.

The term external sensor group 31 herein is a collective designation encompassing multiple sensors (external sensors) for detecting external circumstances constituting subject vehicle ambience data. For example, the external sensor group 31 includes, inter alia, a LIDAR (Light Detection and Ranging) for measuring distance from the vehicle to ambient obstacles by measuring scattered light produced by laser light radiated from the subject vehicle in every direction, a RADAR (Radio Detection and Ranging) for detecting other vehicles and obstacles around the subject vehicle by radiating electromagnetic waves and detecting reflected waves, and a CCD, CMOS or other image sensor-equipped on-board cameras for imaging subject vehicle ambience (forward, reward and sideways). The inter-vehicle distance from the subject vehicle to other vehicles can be measured by any of LIDAR, RADAR and the on-board cameras.

The term internal sensor group 32 herein is a collective designation encompassing multiple sensors (internal sensors) for detecting subject vehicle driving state. For example, the internal sensor group 32 includes, inter alia, an engine speed sensor for detecting engine rotational speed, a vehicle speed sensor for detecting subject vehicle running speed, acceleration sensors for detecting subject vehicle forward-rearward direction acceleration and lateral acceleration, respectively, and a yaw rate sensor for detecting rotation angle speed around a vertical axis through subject vehicle center of gravity. The internal sensor group 32 also includes sensors for detecting driver driving operations in manual drive mode, including, for example, accelerator pedal operations, brake pedal operations, steering wheel operations and the like.

The term input-output unit 33 is used herein as a collective designation encompassing apparatuses receiving instructions input by the driver and outputting information to the driver. For example, the input-output unit 33 includes, inter alia, switches which the driver uses to input various instructions, a microphone which the driver uses to input voice instructions, a display for presenting information to the driver via displayed images, and a speaker for presenting information to the driver by voice. The switches include a mode select switch for instructing either self-drive mode or manual drive mode, and a driving level instruction switch for instructing a driving automation level.

Driving automation level is an index of driving automation degree. SAE J3016 recommended by SAE (Society of Automotive Engineers) International, for example, classifies driving automation into Level 0 to Level 5. Level 0 indicates no driving automation. At level 0, all driving operations are performed by a human operator (driver).

At Level 1, the travel control system performs one among acceleration, steering and braking of the Dynamic Driving Task (DDT) (in driver assistance automation). At Level 1, therefore, the travel control system (driving automation system) operates under specified conditions to control some among the accelerator, brakes and steering wheel in accordance with surrounding circumstances, and the driver performs all of the remaining DDT.

At Level 2, the system simultaneously performs multiple DDT subtasks among acceleration, steering and braking (in partial driving automation). Up to Level 2, the driver is responsible for monitoring vehicle surroundings.

At Level 3, the system performs all of the DDT acceleration, steering and braking subtasks, and the driver responds only when requested by the system (conditional driving automation). At Level 3 and higher, the system monitors the surroundings and no responsibility to monitor surroundings falls on a human.

At Level 4, the system performs the entire DDT under specified conditions and a user (driver) does not take over even when the system cannot continue driving (high driving automation). At Level 4 and higher, therefore, the system deals even with emergency situations.

At Level 5, the system autonomously self-drives under all conditions (full driving automation).

The driving level instruction switch is, for example, configured as a switch manually operable by the driver to select one of Levels 0 to 5 as driving automation level. Optionally, the travel control system 100 can be adapted to determine whether factors like surrounding circumstances meet conditions enabling self-driving and automatically operate the driving level instruction switch to instruct selection of one of the Levels 0 to 5 in accordance with the determination results.

The GPS unit 34 includes a GPS receiver for receiving position determination signals from multiple GPS satellites, and measures absolute position (latitude, longitude and the like) of the subject vehicle based on the signals received from the GPS receiver.

The map database 35 is a unit storing general map data used by the navigation unit 36 and is, for example, implemented using a hard disk. The map data include road position data and road shape (curvature etc.) data, along with intersection and road branch position data. The map data stored in the map database 35 are different from high-accuracy map data stored in a memory unit 42 of the controller 40.

The navigation unit 36 retrieves target road routes to destinations input by the driver and performs guidance along selected target routes. Destination input and target route guidance is performed through the input-output unit 33. Target routes are computed based on subject vehicle current position measured by the GPS unit 34 and map data stored in the map database 35.

The communication unit 37 communicates through networks including the Internet and other wireless communication networks to access servers (not shown in the drawings) to acquire map data, traffic data and the like, periodically or at arbitrary times. Acquired map data are output to the map database 35 and/or memory unit 42 to update their stored map data. Acquired traffic data include congestion data and traffic light data including, for instance, time to change from red light to green light.

The actuators AC are provided to perform driving of the vehicle 101. The actuators AC include a clutch actuator 3*a*, and further a throttle actuator for adjusting opening angle of the throttle valve of the engine 1 (throttle opening angle), a shift actuator for changing speed stage of the transmission 2, a brake actuator for operating a braking device 5, and a steering actuator for driving a steering unit.

The controller 40 is constituted by an electronic control unit (ECU). In FIG. 2, the controller 40 is integrally configured by consolidating multiple function-differentiated ECUs such as an engine control ECU, a transmission control ECU, a clutch control ECU and so on. Optionally, these ECUs can be individually provided. The controller 40 incorporates a computer including a CPU or other processing unit (a microprocessor) 41, the memory unit (a memory) 42 of RAM, ROM, hard disk and the like, and other peripheral circuits not shown in the drawings.

The memory unit 42 stores high-accuracy detailed map data including, inter alia, lane center position data and lane boundary line data. More specifically, road data, traffic regulation data, address data, facility data, telephone number data and the like are stored as map data. The road data include data identifying roads by type such as expressway, toll road and national highway, and data on, inter alia, number of road lanes, individual lane width, road gradient, road 3D coordinate position, lane curvature, lane merge and branch point positions, and road signs. The traffic regulation data include, inter alia, data on lanes subject to traffic restriction or closure owing to construction work and the like. The memory unit 42 also stores a shift map (shift chart) serving as a shift operation reference. The memory unit 42 also stores various programs for performing processing and threshold values used in the programs, etc.

As functional configurations, the processing unit 41 includes a subject vehicle position recognition unit 43, an exterior recognition unit 44, an action plan generation unit 45, and a driving control unit 46.

The subject vehicle position recognition unit 43 recognizes map position of the subject vehicle (subject vehicle position) based on subject vehicle position data calculated by the GPS unit 34 and map data stored in the map database 35. Optionally, the subject vehicle position can be recognized using map data (building shape data and the like) stored in the memory unit 42 and ambience data of the vehicle 101 detected by the external sensor group 31, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 37.

The exterior recognition unit 44 recognizes external circumstances around the subject vehicle based on signals from cameras, LIDERs, RADARs and the like of the external sensor group 31. For example, it recognizes position, speed and acceleration of nearby vehicles driving in the vicinity of the subject vehicle, position of vehicles stopped or parked in the vicinity of the subject vehicle, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 45 generates a subject vehicle driving path (target path) from present time point to a certain time ahead based on, for example, a target route computed by the navigation unit 36, subject vehicle position recognized by the subject vehicle position recognition unit 43, and external circumstances recognized by the exterior recognition unit 44. When multiple paths are available on the target route as target path candidates, the action plan generation unit 45 selects from among them the path that optimally satisfies legal compliance, safe efficient driving and other criteria, and defines the selected path as the target path. The action plan generation unit 45 then generates an action plan matched to the generated target path. An action plan is also called "travel plan".

The action plan includes action plan data set for every unit time $\Delta t$ (e.g., 0.1 sec) between present time point and a predetermined time period T (e.g., 5 sec) ahead, i.e., includes action plan data set in association with every unit time $\Delta t$ interval. The action plan data include subject vehicle position data and vehicle state data for every unit time $\Delta t$. The position data are, for example, data indicating 2D coordinate position on road, and the vehicle state data are vehicle speed data indicating vehicle speed, direction data indicating subject vehicle direction, and the like. The vehicle state data can be determined from position data change of successive unit times $\Delta t$. Action plan is updated every unit time $\Delta t$.

Figure 3:
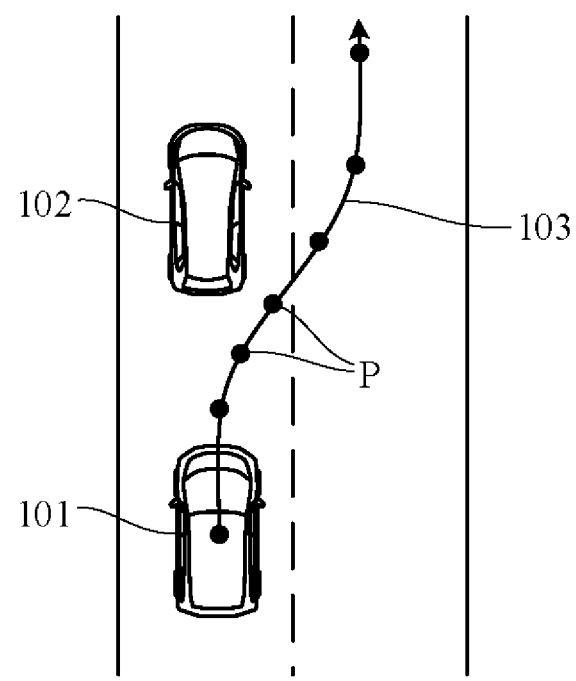
FIG. 3 is a diagram showing an example of an action plan generated by an action plan generation unit of FIG. 2.

FIG. 3 is a diagram showing an action plan generated by the action plan generation unit 45. FIG. 3 shows a scene depicting an action plan for the subject vehicle 101 when changing lanes and overtaking a forward vehicle 102 (preceding vehicle). Points P in FIG. 3 correspond to position data at every unit time $\Delta t$ between present time point and predetermined time period T1 ahead. A target path 103 is obtained by connecting the points P in time order. The action plan generation unit 45 generates not only overtake action plans but also various other kinds of action plans for, inter alia, lane-changing to move from one traffic lane to another, lane-keeping to maintain same lane and not stray into another, and decelerating or accelerating.

When generating a target path, the action plan generation unit 45 first decides a drive mode and generates the target path in line with the drive mode. When creating an action plan for lane-keeping, for example, the action plan generation unit 45 firsts decides drive mode from among modes such as cruising, overtaking, decelerating, and curve negotiating. To cite particular cases, the action plan generation unit 45 decides cruising mode as drive mode when no other vehicle is present ahead of the subject vehicle (no forward vehicle) and decides following mode as drive mode when a vehicle ahead is present. In following mode, the action plan generation unit 45 generates, for example, running plan data for suitably controlling inter-vehicle distance to a forward vehicle in accordance with vehicle speed.

In self-drive mode, the driving control unit 46 controls the actuators AC to drive the subject vehicle 101 along target path 103 generated by the action plan generation unit 45. For example, the driving control unit 46 controls the clutch actuator, throttle actuator, shift actuator, brake actuator and steering actuator so as to drive the subject vehicle 101 through the points P of the unit times $\Delta t$ in FIG. 3.

More specifically, in self-drive mode, the driving control unit 46 calculates acceleration (target acceleration) of sequential unit times $\Delta t$ based on vehicle speed (target vehicle speed) at points P of sequential unit times $\Delta t$ on target path 103 (FIG. 3) included in the action plan generated by the action plan generation unit 45. In addition, the driving control unit 46 calculates required driving force for achieving the target accelerations taking running resistance caused by road gradient and the like into account. And the actuators AC are feedback controlled to bring actual acceleration detected by the internal sensor group 32, for example, into coincidence with target acceleration. On the other hand, in manual drive mode, the driving control unit 46 controls the actuators AC in accordance with driving instructions by the driver (accelerator opening angle and the like) acquired from the internal sensor group 32.

An important point in this regard is that amount of heat generated by the start clutch 3 becomes great when, for example, heavy traffic leads to frequent starting and stopping in a short period, very low-speed running, or similar condition. Therefore, when the subject vehicle is following a vehicle that repeatedly starts, stops and runs at very low speed, if the subject vehicle should also repeatedly start, stop and run at very low speed in unison with the forward vehicle, the start clutch 3 (especially its clutch disks) are apt to rise to a temperature exceeding allowable temperature.

Figure 4:
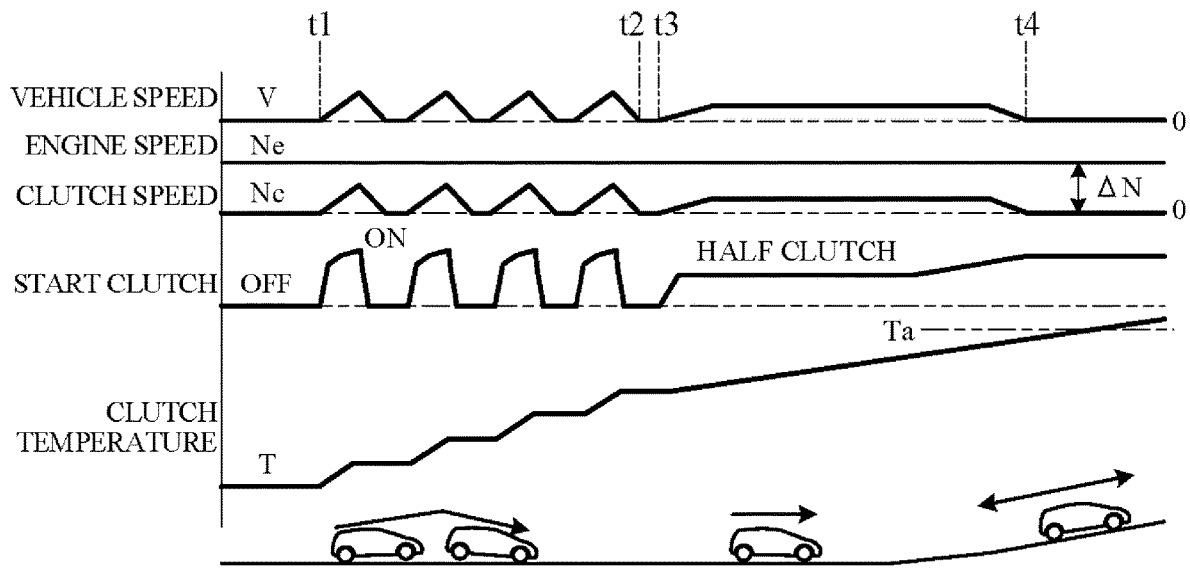
FIG. 4 is a time chart for comparison with the travel control apparatus according to the embodiment of the present invention, showing an example of temperature increase of a start clutch.

FIG. 4 is a time chart showing an example of such temperature increase of the start clutch 3. The time chart of FIG. 4 is an example for comparison with the present embodiment. FIG. 4 shows not only temperature (clutch temperature) T of the start clutch 3 but also vehicle speed V, rotational speed of the output shaft 1*a* of the engine 1 (engine speed) Ne, rotational speed of the input shaft 2*a* of the transmission 2 (clutch speed) Nc, and time-course change of operating state of the start clutch 3.

In the example of FIG. 4, starting and stopping are repeated in a short period between time t1 and time t2, so that the start clutch 3 is repeatedly turned ON and OFF and clutch temperature T rises. Next, during ensuing continuous very low-speed running between time t3 and time t4, the start clutch 3 assumes a partially engaged condition (half-clutch condition) in which clutch temperature T rises still higher owing to slipping between the clutch disks. Next, in the course of hill-climbing following time t4, the subject vehicle stops with gravitational force acting on the subject vehicle and required driving force acting through the start clutch 3 offsetting each other, which also causes clutch temperature T to increase. As a result of such temperature increases, clutch temperature T is apt to rise above allowable temperature Ta and pose a hindrance to traveling. The travel control apparatus according to the present embodiment is configured as set out in the following in order to avoid excessive increase of clutch temperature T during this kind of following of a forward vehicle.

Figure 5:
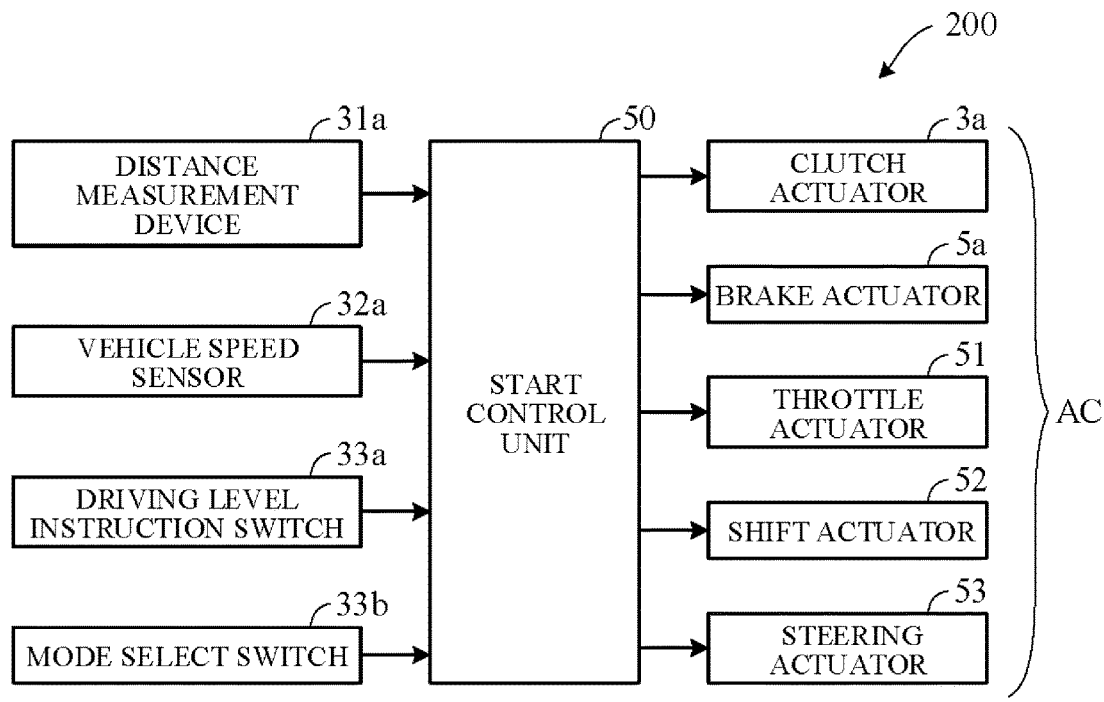
FIG. 5 is a block diagram illustrating main configuration of the travel control apparatus of the self-driving vehicle according to the embodiment of the present invention.

FIG. 5 is a block diagram showing main components of a travel control apparatus 200 of the self-driving vehicle according to an embodiment of the present invention. The travel control apparatus 200 of FIG. 5 configures part of the travel control system 100 of FIG. 2. As shown in FIG. 5, a start control unit 50 receives signals from distance measurement device 31*a*, a vehicle speed sensor 32*a*, a driving level instruction switch 33*a*, and a mode select switch 33*b*. The distance measurement device 31*a*, which is equipment for measuring inter-vehicle distance from the subject vehicle to a forward vehicle, incorporates a RADAR, LIDAR, on-board camera and other members of the external sensor group 31 of FIG. 2. The vehicle speed sensor 32*a* is a member of the internal sensor group 32 of FIG. 2. The driving level instruction switch 33*a* and the mode select switch 33*b* are members of the input-output unit 33 of FIG. 2. The driving level instruction switch 33*a* is manually or automatically switched. Driving level changes in accordance with switching of the driving level instruction switch 33a.

The start control unit 50 is a member of the processing unit 41 of FIG. 2 and, for example, incorporates functions of the action plan generation unit 45 and the driving control unit 46. The start control unit 50 performs predetermined processing based on signals from the distance measurement device 31a, vehicle speed sensor 32a, driving level instruction switch 33a and mode select switch 33b. It outputs control signals to actuators AC, i.e., to the clutch actuator 3a, a brake actuator 5a, a throttle actuator 51, a shift actuator 52 and a steering actuator 53.

Figure 6:
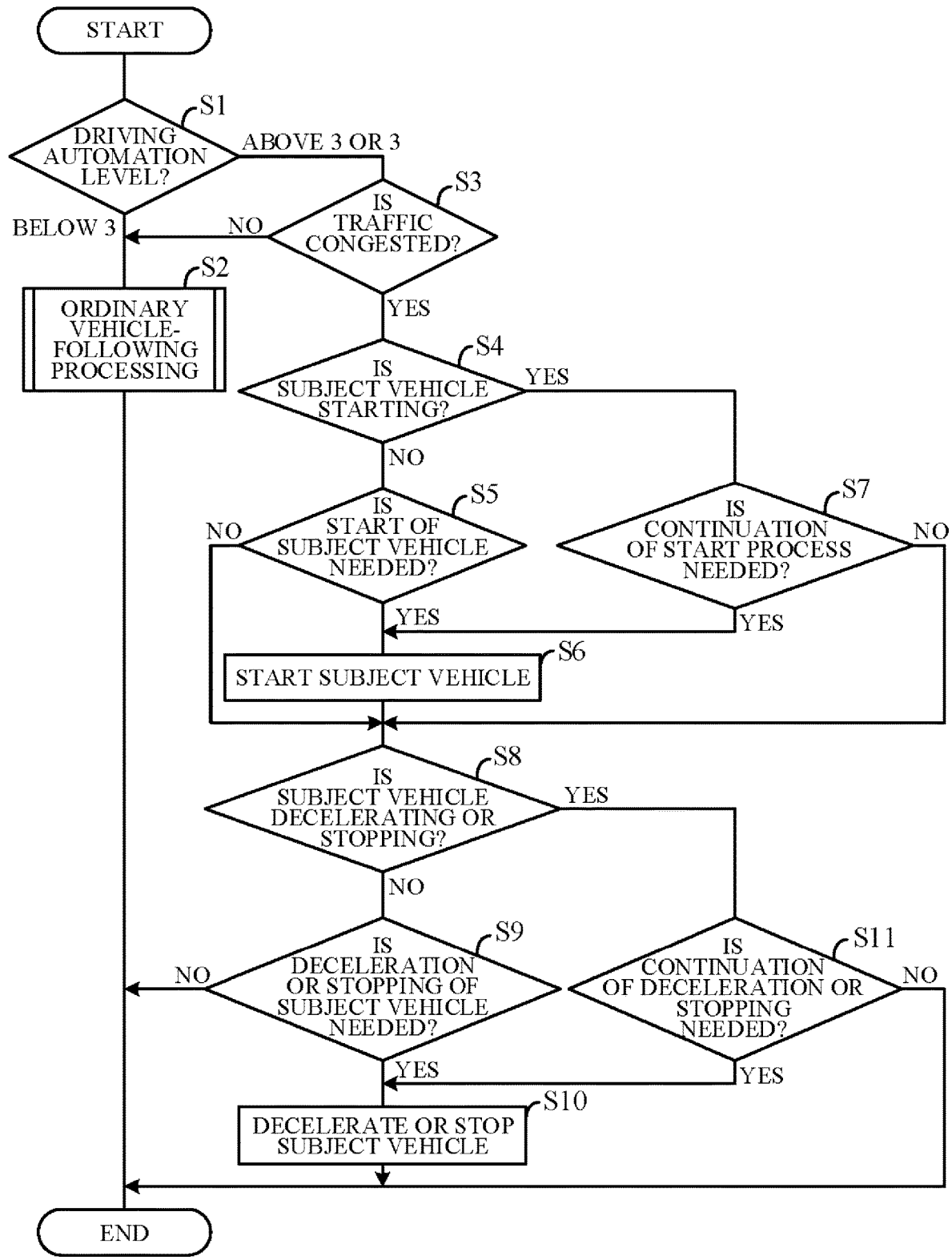
FIG. 6 is a flow chart showing an example of processing performed by a processing unit of FIG. 5.

FIG. 6 is a flowchart showing an example of processing performed by the start control unit 50 in accordance with a program stored in the memory unit 42 in advance. The processing shown in this flowchart starts, for example, when, in a state with self-drive mode selected by switching the mode select switch 33b, the subject vehicle recognizes a forward vehicle and an action plan for following the forward vehicle is generated, and is repeated at predetermined intervals.

First, in S1 (S: processing Step), driving automation level is determined from a signal from the driving level instruction switch 33a. When driving automation level is determined in S1 to be below Level 3, the routine proceeds to S2 to perform ordinary vehicle-following processing. In the ordinary vehicle-following processing, control signals are output to the actuators AC so as to bring inter-vehicle distance L detected by the distance measurement device 31a into coincidence with a target inter-vehicle distance determined in accordance with vehicle speed detected by the vehicle speed sensor 32a (vehicle speed detector). Vehicle following is performed so as to maintain constant inter-vehicle distance by, for example, accelerating when inter-vehicle distance is longer than the target inter-vehicle distance and decelerating when it is shorter, thereby adjusting speed of the subject vehicle to speed of the forward vehicle. Should the forward vehicle decelerate or stop during such following, the subject vehicle decelerates and stops in accordance. When the forward vehicle starts moving again, the subject vehicle also starts and rebegins vehicle following.

When driving automation level is determined to be Level 3 or above in S1, the routine proceeds to S3. In S3, whether traffic is congested is determined. For example, traffic is determined to be congested when vehicle speed detected by the vehicle speed sensor 32a is equal to or less than a predetermined value (is 0, for example) and start acceleration G0 of the forward vehicle is equal to less than a predetermined value Ga. Predetermined value Ga is therefore set at an estimated upper limit value of acceleration in congested traffic. Start acceleration G0 of the forward vehicle can be calculated by second-order time differentiation of distance measured by the distance measurement device 31a. If a negative decision is made at S3, the routine proceeds to S2. If a positive decision is made at S3, the routine proceeds to S4, whereafter congested traffic vehicle-following processing is performed.

Figure 7A:
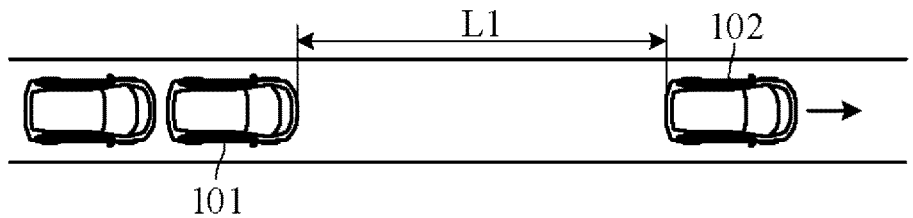
FIG. 7A is a diagram showing a first example of operation by the travel control apparatus of the self-driving vehicle according to the embodiment of the present invention.

In S4, whether the subject vehicle 101 is starting off is determined. If a negative decision is made at S4, the routine proceeds to S5, in which whether the subject vehicle 101 needs to start is determined. As shown in FIG. 7A, this is done by determining whether inter-vehicle distance L reached or exceeded a predetermined value L1 because the forward vehicle 102 started moving ahead while the subject vehicle 101 is stopped, i.e., by determining that the subject vehicle 101 needs to start when L≥L1. If a positive decision is made at S5, the routine proceeds to S6, and if a negative decision is made, the routine skips S6 and proceeds to S8.

In S6, the subject vehicle 101 is started off by outputting signals to the clutch actuator 3a, etc. Specifically, the subject vehicle 101 is started off at predetermined start acceleration G1 and accelerated up to a predetermined clutch engagement vehicle speed V1. Clutch engagement vehicle speed V1 is a vehicle speed at which engine speed becomes equal to or greater than idle speed even when the start clutch 3 is ON (engaged), i.e., a vehicle speed allowing engagement of the start clutch 3. During start of the subject vehicle 101, the start clutch 3 is switched from OFF state to partially engaged condition with engine speed kept at idle speed, and when vehicle speed V detected by the vehicle speed sensor 32a thereafter rises to clutch engagement vehicle speed V1, the start clutch 3 is turned ON. Start acceleration G1 is acceleration at which amount of heat generated by the start clutch 3 is minimum, and is decided as follows.

Figure 8:
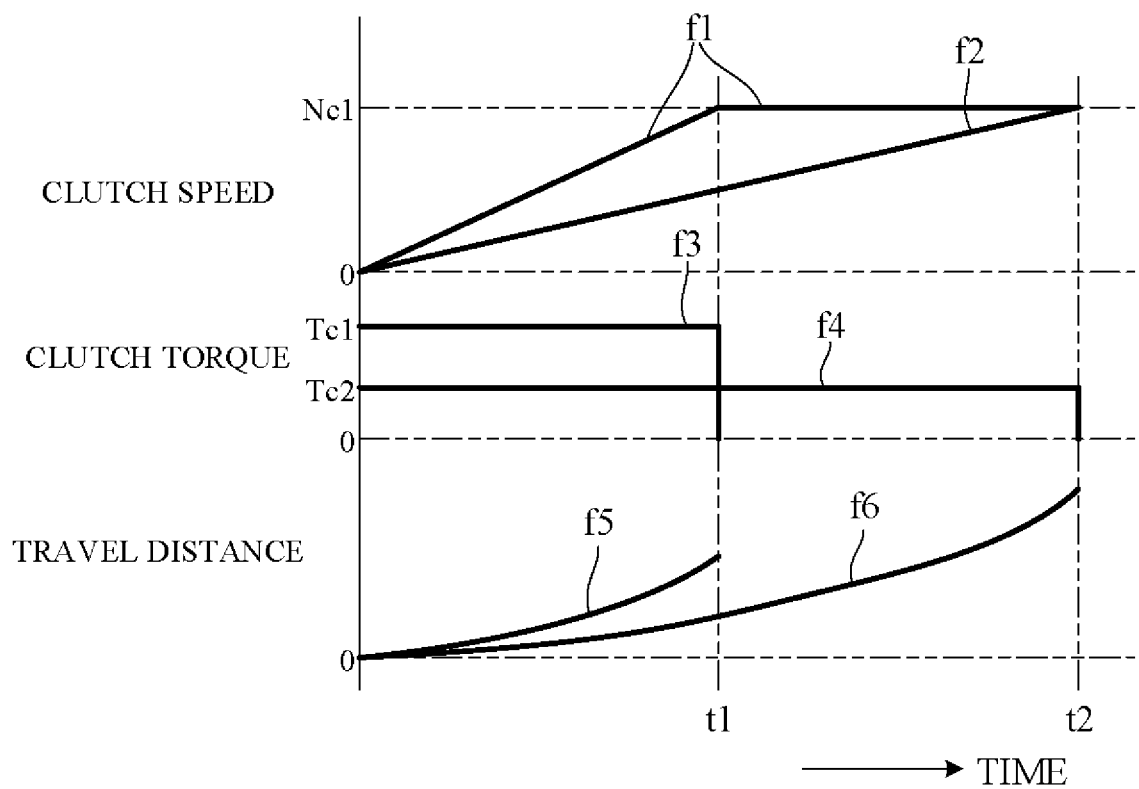
FIG. 8 is a diagram showing examples of change over time of a clutch speed, clutch torque and travel distance.

FIG. 8 is a diagram showing characteristic curves f1 to f6 showing examples of change over time of rotational speed of the input shaft 2a of the transmission 2 (clutch speed Nc), torque acting on the input shaft 2a during clutch partially engaged condition (clutch torque Tc), and subject vehicle travel distance. FIG. 8 shows characteristic curves f3 and f4 of two types of clutch torques Tc1 and Tc2 of different size. Clutch torque Tc1 is twice as large as clutch torque Tc2.

As indicated by characteristic curve f1, when clutch torque is Tc1, clutch speed Nc becomes clutch speed Nc1 corresponding to clutch engagement vehicle speed V1 upon passage of time period t1. On the other hand, as indicated by characteristic curve f2, when clutch torque is Tc2, clutch speed Nc becomes clutch speed Nc1 upon passage of time period t2, which is twice time period t1. As indicated by characteristic curves f5 and f6, subject vehicle travel distance up to when clutch speed rises to Nc1 is longer in proportion as clutch torque Tc is smaller.

Rotational speed difference between engine speed Ne and clutch speed Nc is defined as ΔN, and time period from OFF to ON of the start clutch 3 (engagement action time period up to clutch engagement vehicle speed V1) is defined as t. Amount of heat generated by the start clutch 3 can then be calculated generally by multiplying Tc by ΔN and t (Tc×ΔN×t). As can be seen from FIG. 8, engagement action time period t decreases in proportion as clutch torque Tc is larger, and, conversely, engagement action time period t grows longer with decreasing clutch torque Tc. Clutch torque Tc and start acceleration G1 are in a proportional relationship. Amount of heat generated by the start clutch 3 during acceleration up to clutch engagement vehicle speed V1 is therefore substantially constant regardless of start acceleration G1.

Although it follows from the foregoing that an arbitrary value can be adopted as start acceleration G1 for minimizing amount of heat generated by the start clutch 3, an excessively small start acceleration G1 lengthens travel distance up to when vehicle speed of the subject vehicle reaches clutch engagement vehicle speed V1, and this in turn aggravates surrounding traffic congestion. Taking this into account, start-off acceleration G1 is preferably about 0.1 G to 0.25 G, for example. Start-off acceleration G1 is larger than predetermined value Ga used, for example, to determine congestion (S3).

Figure 7B:
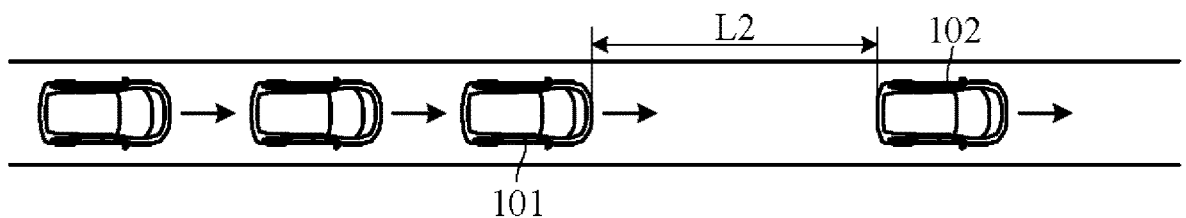
FIG. 7B is a diagram showing a second example of operation by the travel control apparatus of the self-driving vehicle according to the embodiment of the present invention.

After initiating start process in S6, if a positive decision is made at S4 in a later routine cycle, i.e., after initiation of the start process but before vehicle speed V reaches clutch engagement vehicle speed V1, the routine proceeds to S7. In S7, whether to continue start process is determined. This done by determining whether, as shown in FIG. 7B, inter-vehicle distance L to the forward vehicle 102 is equal to or less than a predetermined value L2 predetermined as a value less than predetermined value L1. If a negative decision is made at S7, the routine proceeds to S8. In other words, once the subject vehicle 101 comes somewhat close to the forward vehicle 102, continuing the start process becomes unnecessary, so the program goes to S8. On the other hand, if a positive decision is made at S7, the routine proceeds to S6 and start process is continued.

In S8, whether the subject vehicle 101 is decelerating/stopping, i.e., whether it is either in the process of decelerating or in the process of stopping, is determined. If a negative decision is made at S8, the routine proceeds to S9, in which whether deceleration or stopping is necessary is determined. This is done by determining whether, as shown in FIG. 7B, inter-vehicle distance L is equal to or less than predetermined value L2. If a positive decision is made at S9, the routine proceeds to S10, and if a negative decision is made, the processing is terminated.

Figure 7C:
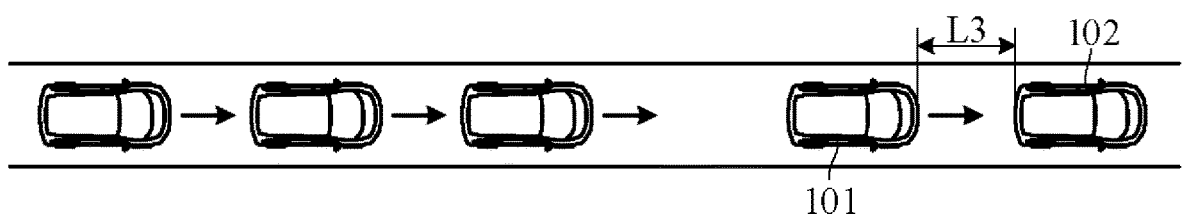
FIG. 7C is a diagram showing a third example of operation by the travel control apparatus of the self-driving vehicle according to the embodiment of the present invention.

In S10, deceleration or stopping of the subject vehicle is performed. Specifically, when inter-vehicle distance L is equal to or less than predetermined value L2, a control signal is output to the clutch actuator 3a to disengage (release) the start clutch 3. The subject vehicle 101 keeps moving by its inertia. Moreover, in S10, when, as shown in FIG. 7C, inter-vehicle distance L is equal to or less than a predetermined value L3 and larger than a predetermined value L4 (FIG. 7D) which is predetermined less than predetermined value L3, a control signal is output to the brake actuator 5a to apply braking force with the start clutch 3 kept in OFF (disengaged) condition. Deceleration of the subject vehicle 101 therefore increases.

Figure 7D:
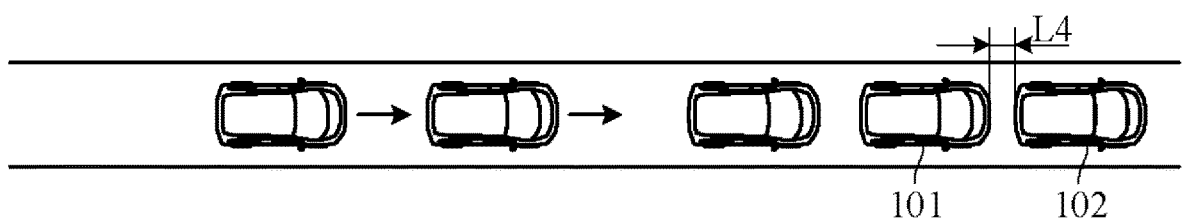
FIG. 7D is a diagram showing a fourth example of operation by the travel control apparatus of the self-driving vehicle according to the embodiment of the present invention.

At this time, braking force is adjusted so that inter-vehicle distance L is predetermined value L4 when vehicle speed V reaches 0, and finally, as shown in FIG. 7D, the subject vehicle 101 stops with inter-vehicle distance L to the forward vehicle 102 at a headway of predetermined value L4. Thus in S10, whether inter-vehicle distance L is equal to or less than predetermined value L3 is determined, and control signals are output to the clutch actuator 3a and brake actuator 5a in accordance with the determination result. Deceleration and stopping can therefore be performed optimally with consideration to the inter-vehicle distance L.

After initiating decelerating/stopping in S10, if a positive decision is made at S8 in a later routine cycle, the routine proceeds to S11. In S11, whether to continue decelerating/stopping is determined. This is done by, for example, determining whether inter-vehicle distance L is equal to or less than predetermined value L2 (FIG. 7B), and when L≤L2, is determined, the routine proceeds to S10. On the other hand, when inter-vehicle distance L is determined to be greater than predetermined value L2, processing is terminated.

Figure 9:
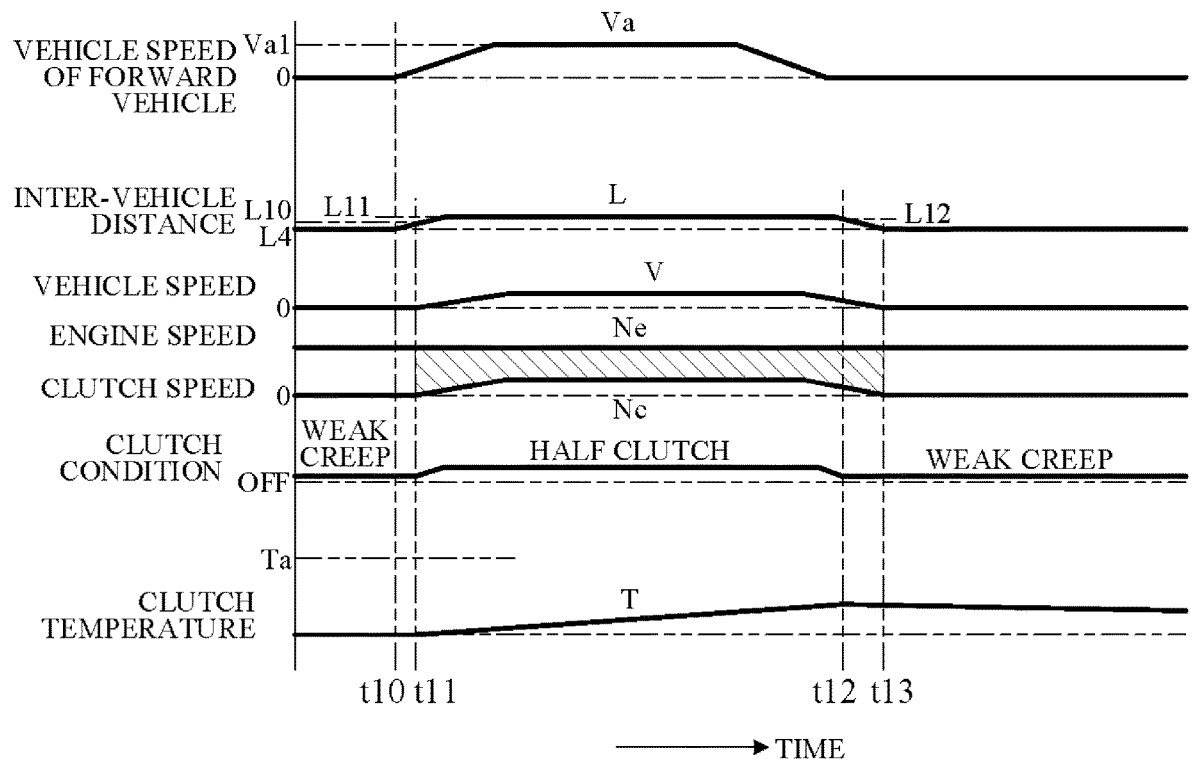
FIG. 9 is a time chart showing an example of operation of following when a forward vehicle slowly starts and stops at a driving automation level below Level 3.
Figure 10:
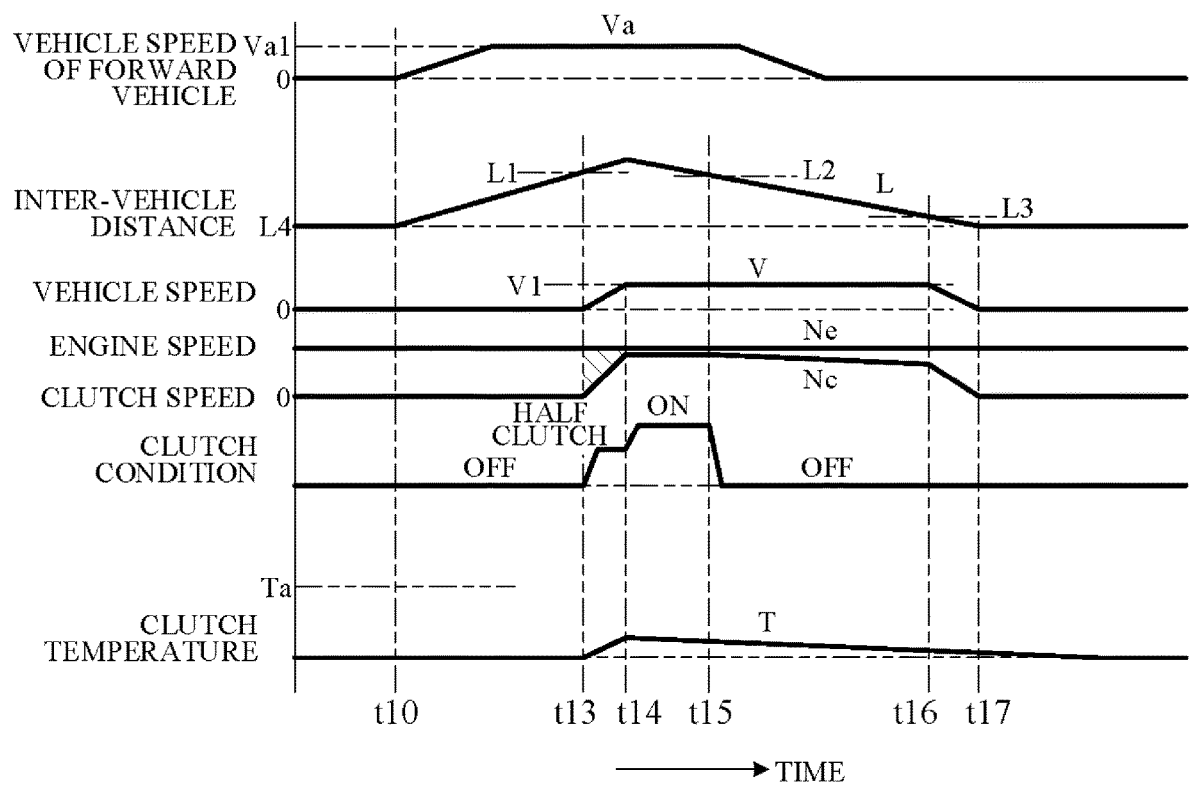
FIG. 10 is a time chart showing an example of operation of following when a forward vehicle slowly starts and stops at a driving automation level of or above Level 3.

A more concrete explanation of the main operations of the travel control apparatus 200 according to the embodiment of the present invention follows. FIGS. 9 and 10 are time charts showing examples of vehicle-following in cases where the forward vehicle 102 gradually starts off and gradually stops. Each time chart indicates vehicle speed of the forward vehicle 102 (forward vehicle speed Va), inter-vehicle distance L, and vehicle speed, engine speed Ne, clutch speed Nc, clutch state, and time-course change of clutch temperature T of the subject vehicle 101. FIG. 9 shows an example of ordinary vehicle-following at a driving automation level below Level 3 (e.g., Level 1), and FIG. 10 shows an example of congested traffic vehicle-following at a driving automation level of or above Level 3.

As shown in FIG. 9, in initial state of ordinary vehicle-following at a driving automation level below Level 3, the start clutch 3 is driven by the clutch actuator 3a to establish a weak creep condition in which a weak creep force acts. At this time, the subject vehicle 101 is stopped (V=0) by the brake actuator 5a, and inter-vehicle distance L to the forward vehicle 102 is predetermined value L4 (FIG. 7D). Then when the forward vehicle 102 starts off at time t10 and inter-vehicle distance L increases to become equal to or greater than a predetermined value L10 at time t11, the braking device 5 is released and clutch speed Nc is increased by partial engagement of the start clutch 3. Predetermined value L10 is set to a value less than predetermined value L1 (FIG. 7A).

Vehicle speed V in this case is lower than clutch engagement vehicle speed V1 and is, for example, equal to speed Va of the forward vehicle 102. As a result, the start clutch 3 does not turn ON (engage) but remains in a partially engaged condition (half clutch condition). Clutch speed Nc following time t1 is therefore greater than 0 and smaller than engine speed Ne owing to slipping of the start clutch 3 (hatched region). As a result, the start clutch 3 generates more heat and clutch temperature T increases. Although clutch temperature T also increases in weak creep condition before time t11, the degree of temperature increase then is lower than when in a half clutch condition. When, after inter-vehicle distance L is being maintained at a predetermined value L11, the forward vehicle 102 stops and inter-vehicle distance L becomes equal to or less than a predetermined value L12 (<L11) at time t12, the start clutch 3 transitions from half clutch condition to weak creep condition and the subject vehicle 101 automatically stops when inter-vehicle distance L thereafter becomes predetermined value L4 at time t13.

As shown in FIG. 10 on the other hand, in initial state of congested traffic running at a driving automation level of or above Level 3, the start clutch 3 of the subject vehicle 101 assumes OFF condition. Therefore, no creep force acts on the start clutch 3, and the subject vehicle 101 is stopped in this state by action of the braking device 5. When the forward vehicle 102 starts off at time t10 and inter-vehicle distance L reaches predetermined value L1 at time t13, the start clutch 3 enters half clutch condition, whereby the subject vehicle 101 starts off at predetermined start acceleration G1 (S5→S6). Since predetermined value L1 is greater than predetermined value L10 of FIG. 9, the subject vehicle 101 starts off with greater headway (inter-vehicle distance) L at Level 3 or above than at below Level 3.

When vehicle speed V thereafter reaches clutch engagement vehicle speed V1 at time t14, the start clutch 3 turns ON and start operation is continued until inter-vehicle distance L decreases to or below predetermined value L2 (S7→S6). In the course of this, a half clutch condition that increases clutch temperature T arises only between time t13 and t14 (hatched region), so that degree of clutch temperature T increase is low. Clutch temperature T can therefore be reliably held to or below allowable temperature Ta.

When inter-vehicle distance L decreases to or below predetermined value L2 at time t15, the start clutch 3 turns OFF (S9→S10). As a result, the subject vehicle 101 gradually slows as it moves by inertia (coasting travel). When inter-vehicle distance L thereafter falls to or below predetermined value L3 at time t16, deceleration of the subject vehicle 101 increases owing to action of the braking device 5 (S11→S10). When inter-vehicle distance L reaches predetermined value L4 at time t17, the subject vehicle 101 is automatically stopped by action of the braking device 5.

Figure 11:
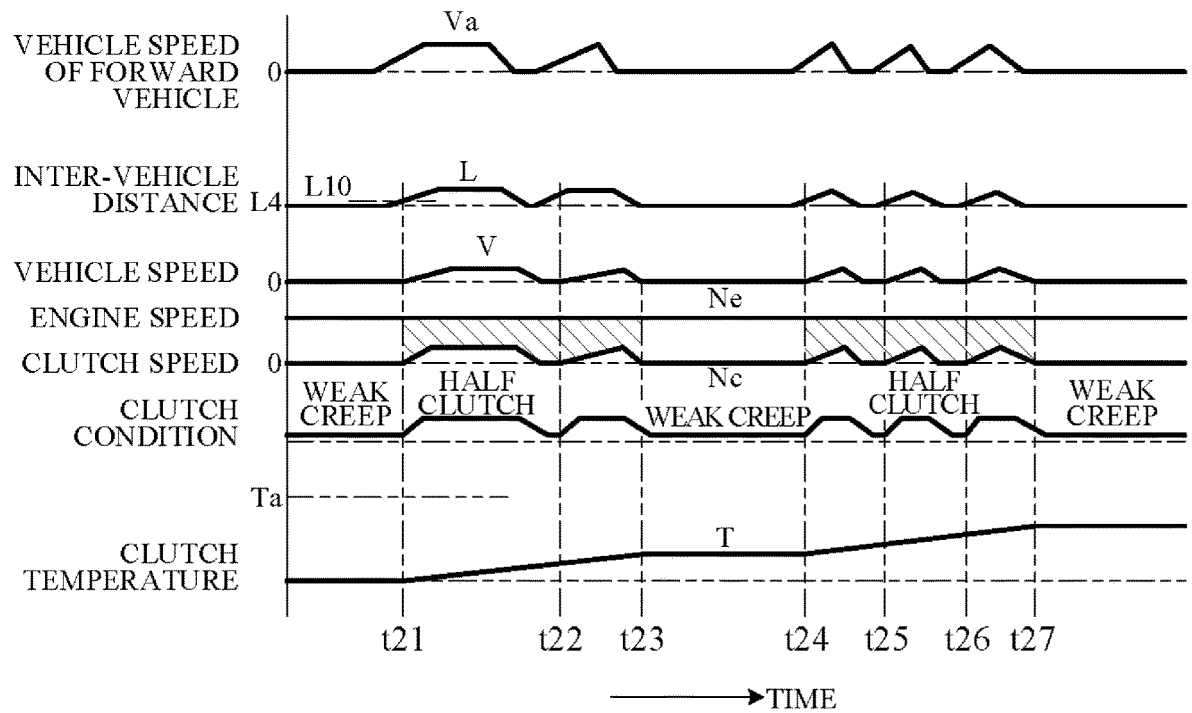
FIG. 11 is a time chart showing an example of operation of following when a forward vehicle repeatedly starts and stops at a driving automation level below Level 3.
Figure 12:
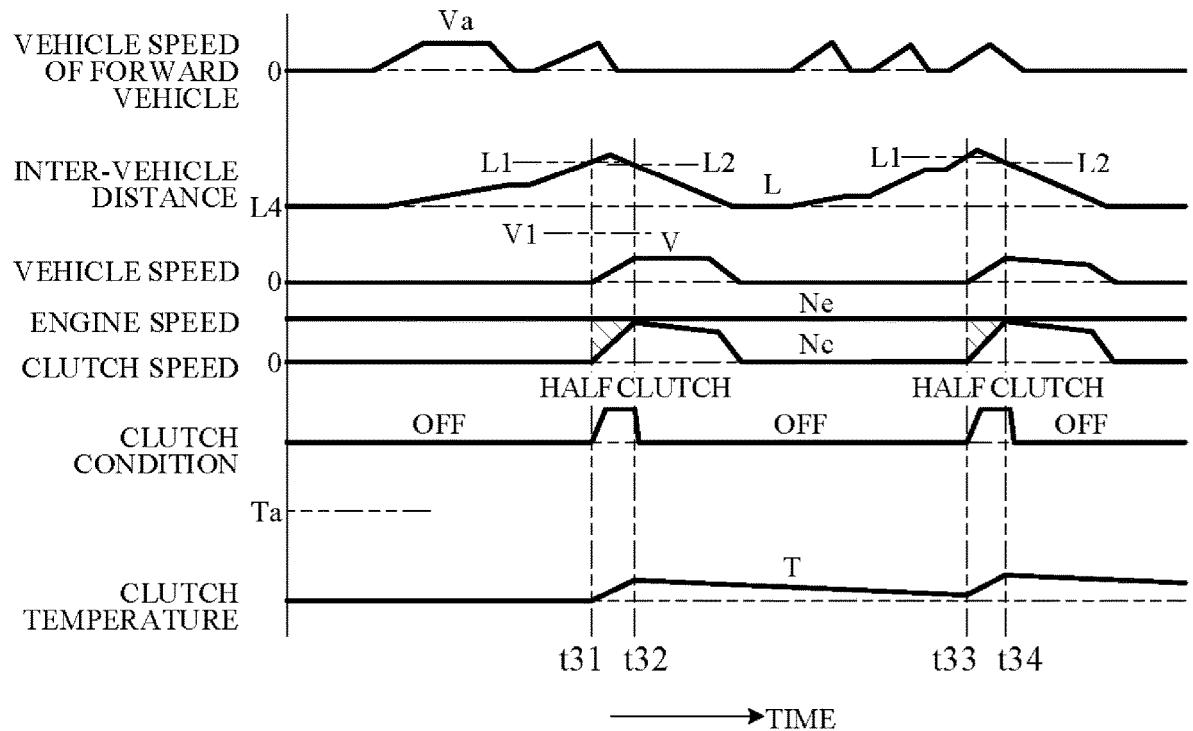
FIG. 12 is a time chart showing an example of operation of following when a forward vehicle repeatedly starts and stops at a driving automation level of or above Level 3.

FIGS. 11 and 12 are time charts showing examples of vehicle-following in cases where the forward vehicle 102 repeatedly starts and stops. FIG. 11 shows an example of ordinary vehicle-following at a driving automation level below Level 3 (e.g., Level 1), and FIG. 12 shows an example of congested traffic vehicle-following at a driving automation level of or above Level 3. When, as shown in FIG. 11, the forward vehicle 102 starts off and inter-vehicle distance L thereafter becomes equal to or greater than predetermined value L10 at time t21, then, similarly to at time t11 in FIG. 9, the braking device 5 is released and clutch speed Nc increases owing to transition of the start clutch 3 from weak creep condition to half clutch condition.

The aforesaid actions are also similarly performed at times t22, t24, t25 and t26, whereby start operation with the start clutch 3 partially engaged is repeated. At times t21 to t23 and times t24 to t27, clutch speed Nc is greater than 0 and less than engine speed Ne because the start clutch 3 slips (hatched regions). As a result, the start clutch 3 generates more heat and clutch temperature T therefore increases.

When, as shown in FIG. 12 on the other hand, the forward vehicle 102 starts at a time the subject vehicle 101 is stopped, then, similarly to at time t13 in FIG. 10, the start clutch 3 enters half clutch condition when inter-vehicle distance L reaches predetermined value L1 at time T31, whereby the subject vehicle 101 starts at predetermined start acceleration G1 (S6). In this case, however, differently from in FIG. 10, at time t32 before vehicle speed V reaches clutch engagement vehicle speed V1 (during half clutch condition, for example), inter-vehicle distance L becomes equal to or less than predetermined value L2 owing to deceleration and stopping of the forward vehicle 102. As the start clutch 3 therefore turns OFF, the subject vehicle 101 coasts until stopped by action of the braking device 5 (S10).

Actions similar to those at time t31 and time t32 are also performed at time t33 and time t34. In the course of this, half clutch state of the start clutch 3 is during short period from time t31 to time t32 and short period from time t33 to time t34 (hatched regions) so heat generation period of the start clutch 3 is short. Since increase of clutch temperature T is therefore restrained, clutch temperature T can be reliably held to no higher than allowable temperature Ta.

Figure 13:
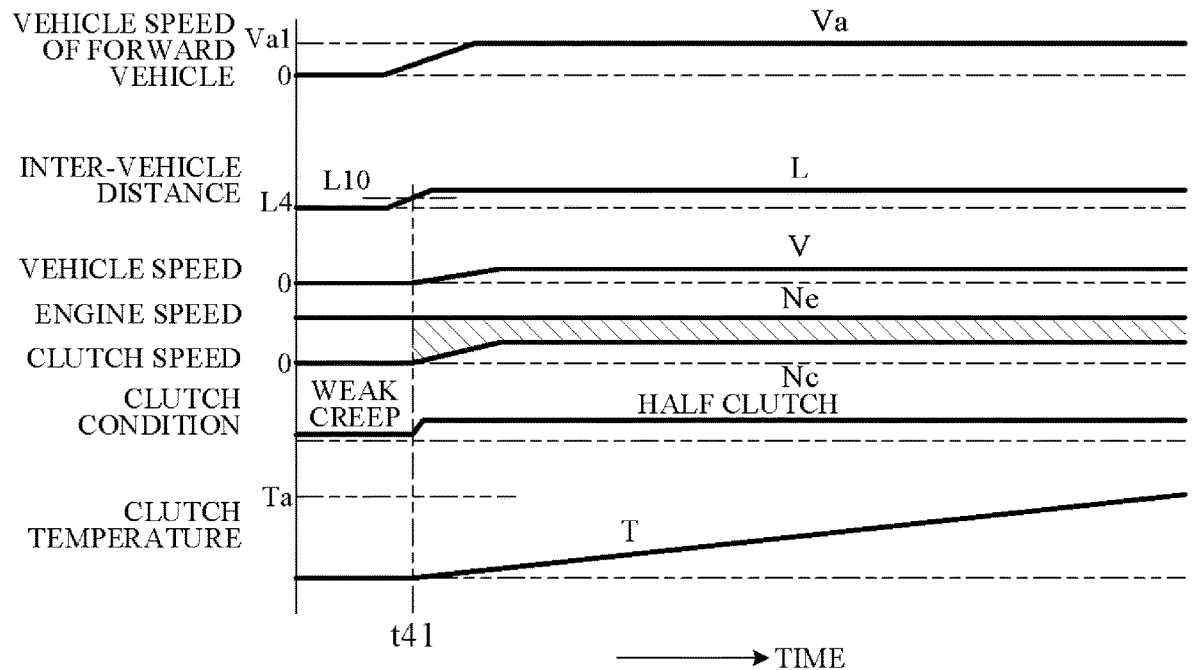
FIG. 13 is a time chart showing an example of operation of following when a forward vehicle slowly starts and then travels at very slow speed at a driving automation level below Level 3.
Figure 14:
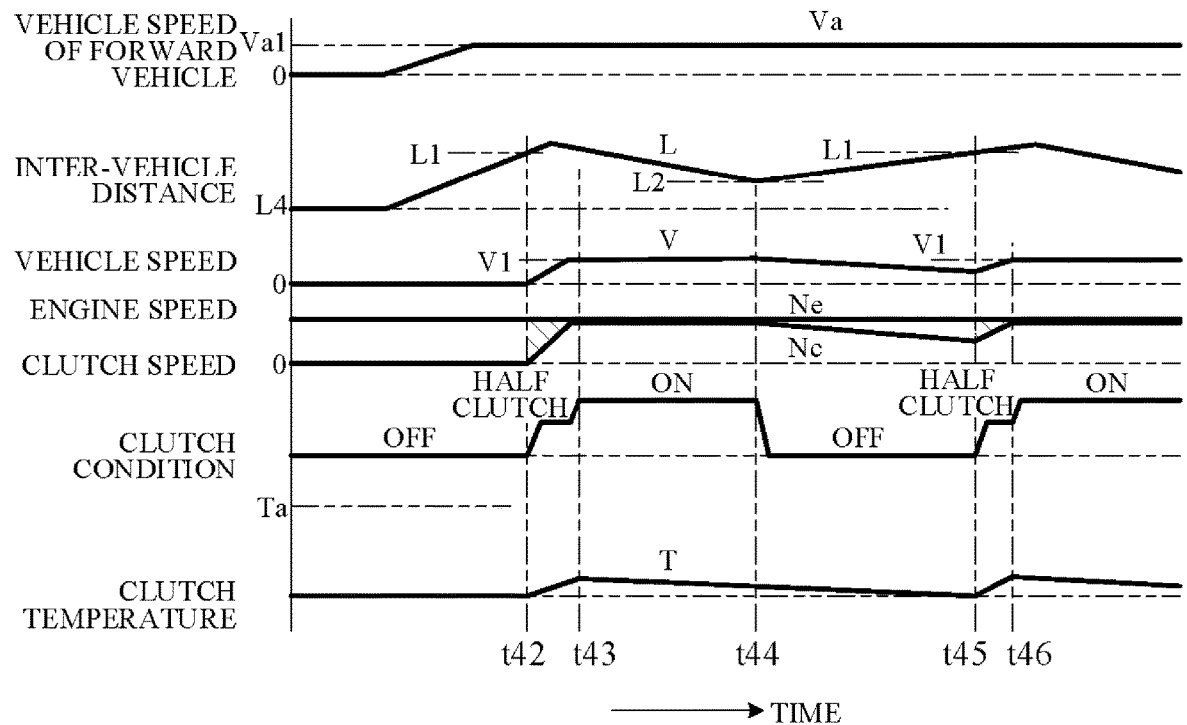
FIG. 14 is a time chart showing an example of operation of following when a forward vehicle slowly starts and then travels at very slow speed at a driving automation level of or above Level 3.

FIGS. 13 and 14 are time charts showing examples of vehicle-following in cases where the forward vehicle 102 starts off slowly and then runs at very low speed Val, and the subject vehicle 101 follows accordingly. FIG. 13 shows an example of ordinary vehicle-following at a driving automation level below Level 3 (e.g., Level 1), and FIG. 14 shows an example of congested traffic vehicle-following at a driving automation level of or above Level 3. When, shown in FIG. 13, the forward vehicle 102 starts off and inter-vehicle distance L thereafter becomes equal to or greater than predetermined value L10 at time t41, then, similarly to at time t11 in FIG. 9, the braking device 5 is released, the start clutch 3 transitions from weak creep condition to half clutch condition, and the subject vehicle 101 runs at constant speed. Since the start clutch 3 generates heat in half clutch condition, clutch temperature T increases when half clutch condition is continued beyond time t41.

When, as shown in FIG. 14 on the other hand, the forward vehicle 102 starts at a time the subject vehicle 101 is stopped, then, similarly to at time t13 in FIG. 10, the start clutch 3 enters half clutch condition when inter-vehicle distance reaches predetermined value L1 at time t42, whereby the subject vehicle 101 starts off at predetermined start acceleration G1 (S6). When vehicle speed V thereafter reaches clutch engagement vehicle speed V1 at time t43, the start clutch 3 turns ON and start operation is continued (S6). When inter-vehicle distance L thereafter falls to or below predetermined value L2 at time t44 owing to speed V of the subject vehicle 101 being faster than speed Val of forward vehicle, the start clutch 3 turns OFF and the subject vehicle 101 decelerates (S10). Inter-vehicle distance L therefore gradually increases as the subject vehicle 101 coasts.

When inter-vehicle distance L again becomes predetermined value L1 or greater at time t45, the start clutch 3 partially engages and vehicle speed V thereafter rises to reach clutch engagement vehicle speed V1 at time t46 and the start clutch 3 turns ON, whereupon actions like those at time t42 and t43 are repeated. In the course of this, half clutch state of the start clutch 3 is during short period from time t42 to time t43 and short period from time t45 to time t46 (hatched regions). Since increase of clutch temperature T is therefore inhibited, clutch temperature T can be reliably held to no higher than allowable temperature Ta.

FIG. 15 is a table summarizing action patterns in the travel control apparatus 200 according to an embodiment of the present invention, particularly action patterns of manual driving, and Level 1, Level 2 and Level 3 upward self-driving (Self Lv1, Self Lv2 and Self Lv3&Up). As shown in FIG. 15, in manual driving and Level 1 self-driving, creep forces (weak creep force and strong creep force) act during stopping and traveling respectively. Strong creep force acts during traveling in Level 2 self-driving. In contrast, creep force does not act during either stopping or traveling in Level 3 upward self-driving. Heat generation by the start clutch 3 attributable to creep force action can therefore be inhibited.

During manual driving, start timing is arbitrary, during Level 1 self-driving, the forward vehicle 102 is faithfully followed, and during Level 2 self-driving, start begins upon emergence of small headway (small inter-vehicle distance L). In contrast with this, during Level 3 upward self-driving, start begins upon emergence of abundant headway (large inter-vehicle distance L). Specifically, start operation commences when inter-vehicle distance L becomes predetermined value L1. Although start during Level 1 and Level 2 self-driving is also begun when inter-vehicle distance L reaches a predetermined value, the predetermined values in these cases grow larger in order of driving automation of Level 1, Level 2 and Level 3 upward. During Level 1 vehicle-following, inter-vehicle distance L is maintained at a predetermined value following start operation.

Start acceleration is equal to start acceleration G0 of forward vehicle during manual driving and Level 1 self-driving, is value G2 greater than value G0 during Level 2 self-driving, and is value G1 greater than value G2 during Level 3 upward self-driving. In other words, in view of inter-vehicle distance L at start being long during Level 3 upward self-driving, start acceleration G is defined larger than at driving automation levels below Level 3 in order to quickly accelerate to clutch engagement vehicle speed V1 and thereby avoid aggravating congestion.

Target vehicle speed is equal to speed Val of forward vehicle 102 during manual driving and Level 1 self-driving, is value V2 greater than value Val during Level 2 self-driving, and is value V1 (clutch engagement vehicle speed) greater than value V2 during Level 3 upward self-driving. Clutch ON-OFF very low speed traveling, i.e., traveling in which the start clutch is repeatedly turned ON and OFF, is performed only during Level 3 upward self-driving.

The present embodiment can achieve advantages and effects such as the following:

(1) The travel control apparatus 200 of the self-driving vehicle 101, which is adapted to control the start clutch 3 and braking device 5 actuated during vehicle start-off, includes: the driving level instruction switch 33a for switching to driving automation level below Level 3 involving driver responsibility to monitor surroundings during traveling or to driving automation level of or above Level 3 not involving driver responsibility to monitor surroundings during traveling; the distance measurement device 31a for measuring inter-vehicle distance L to the forward vehicle 102; and the start control unit 50 for controlling the start clutch 3 and braking device 5 in accordance with inter-vehicle distance L measured by the distance measurement device 31a so as to follow the forward vehicle 102 (FIG. 5). The start control unit 50 controls the start clutch 3 and braking device 5 so that inter-vehicle distance L to the forward vehicle 102 at the time of starting the subject vehicle is larger when the driving level instruction switch 33a switches to driving automation level of or above Level 3 than when it switches to driving automation level below Level 3.

More specifically, the start control unit 50 controls the start clutch 3 and braking device 5 in driving automation level below Level 3 to stay stopped until measured inter-vehicle distance L increases predetermined value L10 and to start when inter-vehicle distance L increases up to predetermined value L10. On the other hand, the start control unit 50 controls the start clutch 3 and braking device 5 in driving automation level of or above Level 3 to stay stopped until measured inter-vehicle distance L increases predetermined value L1 greater than predetermined value L10 and to start when inter-vehicle distance L increases up to predetermined value L1 (FIGS. 9 and 10, among others).

In driving automation level of or above Level 3, since start is thus commenced after inter-vehicle distance L expands, frequency of subject vehicle 101 starting and stopping can be reduced in a case where the forward vehicle 102 repeatedly starts and stops in congested traffic. Since heat load of the start clutch 3 is therefore lowered, rise of clutch temperature T can be inhibited. In addition, degradation of start clutch 3 performance by friction and the like can be minimized and durability of start clutch 3 can be enhanced.

Moreover, since driving automation level of or above Level 3 involves no responsibility to monitor vehicle surroundings, the driver may not notice or be unconcerned about any expansion of inter-vehicle distance L that arises, so even if inter-vehicle distance L grows to a longer headway than usual, the driver is not adversely mentally affected. Nor is traffic congestion aggravated by inter-vehicle distance (headway) L becoming longer insofar as predetermined value L1 is set to a suitable value. Analyzing the driver's mental state, the driver may have difficulty staying relaxed when responsible for monitoring surrounding circumstances because the driver is apt to feel an urge to rapidly commence start from stopped state as soon as inter-vehicle distance L becomes longer than usual but can probably stay relaxed when not responsible for monitoring surrounding circumstances and therefore less likely to feel an urgent need to start. Based on this analysis it follows that the driver can be made to feel more relaxed and good vehicle-following with minimal heat load on the start clutch 3 be achieved by adjusting inter-vehicle distance L at the time of vehicle starting in accordance with whether the driver is responsible for monitoring vehicle surroundings.

(2) When driving automation is switched to driving automation level of or above Level 3, the start control unit 50 responds to measured inter-vehicle distance L having increased up to predetermined value L1 by controlling the start clutch 3 and braking device 5 so that the subject vehicle 101 starts and thereafter responds to inter-vehicle distance L falling to or less than predetermined value L2 less than predetermined value L1 by controlling the start clutch 3 to OFF condition and thereby lowering travel driving force to 0. Since the subject vehicle 101 therefore coasts at low speed when inter-vehicle distance L becomes equal to or less than predetermined value L2, length of time the clutch is partially engaged is shortened and clutch temperature increase is minimized. In other words, temperature increase of the start clutch 3 acting as a heat-generation source can be effectively inhibited because the start clutch 3 is controlled in accordance with inter-vehicle distance L so as to intermittently transmit torque of the engine 1 to the transmission 2.

(3) The start control unit 50 uses signals from the distance measurement device 31a and the vehicle speed sensor 32a to detect start acceleration G0 of the forward vehicle 102, and on condition of detected start acceleration G0 being equal to or less than predetermined value Ga, controls the start clutch 3 and the braking device 5 when driving automation is switched to driving automation level of or above Level 3 so that inter-vehicle distance L to forward vehicle 102 at the time of starting the subject vehicle is greater than when driving automation is switched to driving automation level below Level 3. Therefore, during congested traffic traveling of small start acceleration G0 when in driving automation level of or above Level 3, vehicle-following is performed that creates long inter-vehicle distance (headway) L, thereby making it possible to perform vehicle-following matched to traffic conditions whether or not congested.

(4) When driving automation is switched to driving automation level below Level 3, the start control unit 50 activates creep force in the start clutch 3 in vehicle stopped condition, but when driving automation is switched to driving automation level of or above Level 3, the start control unit 50 disengages (releases) the start clutch 3 and actuates the braking device 5. Since creep force therefore does not act in driving automation level of or above Level 3 when vehicle is stopped, heat generation by the start clutch 3 can be more effectively inhibited.

Various modifications of the present embodiment are possible. Some examples are explained in the following. In the aforesaid embodiment, inter-vehicle distance L to the forward vehicle is measured using distance measurement device 31a including a LIDAR, RADAR, camera or the like. However, a distance measurement device is not limited to this configuration. In the aforesaid embodiment, acceleration of the forward vehicle 102 is detected by second-order time differentiation of distance L detected by the distance measurement device 31a. However, an acceleration detector is not limited to this configuration. For example, the subject vehicle 101 can by wireless communication acquire an acceleration value detected by a sensor of the forward vehicle 102. In the aforesaid embodiment, whether traffic is congested is determined by determining whether start acceleration G0 of the forward vehicle 102 is equal to or less than predetermined value Ga. However, a congestion determination method is not limited to that described in the foregoing and it is possible instead to determined whether traffic is congested based on, for example, traffic information acquired through the communication unit 37.

In the aforesaid embodiment, the start control unit 50 performs control in driving automation level below Level 3 to start when inter-vehicle distance L increases up to predetermined value L10 (first predetermined value) and performs control in driving automation level of or above Level 3 to start off when inter-vehicle distance L increases up to predetermined value L1 (second predetermined value) and thereafter controls actions of the start clutch 3 and braking device 5 so that the start clutch 3 assumes OFF condition when inter-vehicle distance L becomes equal to or less than predetermined value L2 (third predetermined value). Moreover, in the aforesaid embodiment, the start control unit 50 actuates the braking device 5 to exert braking force to the subject vehicle 101 when inter-vehicle distance L becomes equal to or less than predetermined value L3 (fourth predetermined value) of smaller value than predetermined value L2 and thereafter stops the subject vehicle 101 with the braking device 5 when inter-vehicle distance L reaches predetermined value L4 (fifth predetermined value) of smaller value than predetermined value L3. However, a microprocessor for controlling the start clutch and other equipment in accordance with inter-vehicle distance so as to follow a forward vehicle is not limited to this configuration. In other words, a microprocessor can be of any configuration insofar as it controls the start clutch and other equipment so that when driving automation is switched to driving automation level of or above Level 3 (second driving automation level), start time is more delayed and inter-vehicle distance to forward vehicle at the time of start of the vehicle is greater than when driving automation is switched to driving automation level below Level 3 (first driving automation level). For example, a configuration can be adopted that effects switching control not only in accordance with driving automation level but also in accordance with clutch temperature to enable creep force action on the start clutch 3 when cold to promote heat generation and prevent creep force from acting on the start clutch 3 when hot.

In the aforesaid embodiment, driving automation is classified into Level 0 to Level 5 and the start control unit 50 is adapted to perform different control with respect to the start clutch 3 and the braking device 5 depending whether driving automation is in driving automation level below Level 3 or in driving automation level of or above Level 3. However, driving automation level classification is not limited to the aforesaid. In other words, driving automation level can be classified in any manner insofar as classified into at least a first driving automation level involving driver responsibility to monitor surroundings during traveling (below Level 3) and a second driving automation level not involving driver responsibility to monitor surroundings during traveling (Level 3 and above). In the aforesaid embodiment, driving automation level is switched by the driving level instruction switch 33a. However, a driving level switching portion is not limited to this configuration.

In the aforesaid embodiment, the travel control apparatus 200 is applied to the self-driving vehicle 101 having the start clutch 3. However, a travel control apparatus of the present invention can be similarly applied also to a self-driving vehicle having other equipment actuated when the self-drive vehicle starts, such as a self-driving vehicle having an electric travel motor. A reason for this is that an electric travel motor used in an electric vehicle or a hybrid vehicle is apt to generate heat owing to in-phase current during traffic congestion, and the travel control apparatus can be configured to inhibit this heat generation. The travel control apparatus can also be configured to inhibit heat generation of a power drive unit for controlling driving of an electric travel motor or the like. Therefore, a self-driving vehicle to which the present invention is applied is not limited to a self-driving vehicle having a start clutch.

The present invention can also be used as a travel control method of a self-driving vehicle for controlling an equipment actuated when the self-driving vehicle starts.

The above embodiment can be combined as desired with one or more of the above modifications. The modifications can also be combined with one another.

According to the present invention, in a self-driving vehicle following a forward vehicle, it is possible to sufficiently reduce heat load of an equipment actuated when the self-driving vehicle starts.

Above, while the present invention has been described with reference to the preferred embodiments thereof, it will be understood, by those skilled in the art, that various changes and modifications may be made thereto without departing from the scope of the appended claims.

What is claimed is:

1. A travel control apparatus of a self-driving vehicle for controlling a start clutch and a braking device, comprising:
   a driving level switching portion configured to switch a driving automation level to a first driving automation level involving a driver responsibility to monitor surroundings during traveling or a second driving automation level not involving the driver responsibility to monitor the surroundings during traveling;
   a distance measurement device configured to measure an inter-vehicle distance from the self-driving vehicle to a forward vehicle; and
   an electric control unit including a microprocessor and a memory, wherein
   the microprocessor is configured to perform:
   controlling the start clutch and the braking device in accordance with the inter-vehicle distance measured by the distance measurement device so as to follow the forward vehicle,
   the controlling including controlling the start clutch, in a case that the driving automation level is switched to the first driving automation level by the driving level switching portion, so as to change the start clutch from a released state to a half-clutch state when the inter-vehicle distance measured by the distance measurement device increases up to a first predetermined value, while in a case that the driving automation level is switched to the second driving automation level by the driving level switching portion, so as to change the start clutch from the released state to the half-clutch state when the inter-vehicle distance measured by the distance measurement device increases up to a second predetermined value larger than the first predetermined value.

2. The apparatus according to claim 1, wherein the microprocessor is configured to perform
   the controlling including controlling the start clutch and the braking device, in the case that the driving automation level is switched to the first driving automation level by the driving level switching portion, so that the self-driving vehicle stops when the inter-vehicle distance measured by the distance measurement device is smaller than the first predetermined value and thereafter so that the self-driving vehicle starts when the inter-vehicle distance reaches the first predetermined value, while in the case that the driving automation level is switched to the second driving automation level by the driving level switching portion, so that the self-driving vehicle stops when the inter-vehicle distance measured by the distance measurement device is smaller than the second predetermined value and thereafter so that the self-driving vehicle starts when the inter-vehicle distance reaches the second predetermined value.

3. The apparatus according to claim 2, wherein the microprocessor is configured to perform the controlling including controlling the start clutch, in the case that the driving automation level is switched to the second driving automation level by the driving level switching portion, so as to lower a travel driving force to 0 when the inter-vehicle distance measured by the distance measurement device is smaller than or equal to a third predetermined value, after controlling the start clutch and the braking device equipment so that the self-driving vehicle starts when the inter-vehicle distance increases up to the second predetermined value, and the third predetermined value is smaller than the second predetermined value.

4. The apparatus according to claim 3, wherein the microprocessor is configured to perform the controlling including controlling the braking device so as to exert a braking force to the self-driving vehicle when the inter-vehicle distance measured by the distance measurement device is smaller than or equal to a fourth predetermined value, and the fourth predetermined value is smaller than the third predetermined value.

5. The apparatus according to claim 4, wherein the microprocessor is configured to perform the controlling including controlling the start clutch and the braking device so as to stop the self-driving vehicle when the inter-vehicle distance measured by the distance measurement device is smaller than or equal to a fifth predetermined value, and the fifth predetermined value is smaller than the fourth predetermined value.

6. The apparatus according to claim 1, further comprising an acceleration detector configured to detect an acceleration of the forward vehicle, wherein the microprocessor is configured to perform the controlling including controlling the start clutch, in a condition that the acceleration detected by the acceleration detector is less than or equal to a predetermined value, to change the start clutch from the released state to the half-clutch state at the inter-vehicle distance in accordance with a change of the driving level switching portion.

7. The apparatus according to claim 1, wherein the microprocessor is configured to perform the controlling including controlling the start clutch and the braking device so as to exert a creep force to the start clutch during stopping the self-driving vehicle when the driving automation level is switched to the first driving automation level, while so as to release the start clutch and actuate the braking device during stopping the self-driving vehicle when the driving automation level is switched to the second driving automation level.

8. The apparatus according to claim 1, further comprising a vehicle speed detector configured to detect a vehicle speed of the self-driving vehicle, wherein the microprocessor is configured to perform the controlling including controlling the start clutch to change the start clutch from the released state to the half-clutch state, and thereafter change the start clutch to an engaged state when the vehicle speed detected by the vehicle speed detector is more than or equal to a predetermined value.

9. A travel control method of a self-driving vehicle for controlling a start clutch and a braking device, comprising:

switching a driving automation level to a first driving automation level involving a driver responsibility to monitor surroundings during traveling or a second driving automation level not involving the driver responsibility to monitor the surroundings during traveling;

measuring an inter-vehicle distance from the self-driving vehicle to a forward vehicle; and controlling the start clutch and the braking device in accordance with the inter-vehicle distance so as to follow the forward vehicle, wherein the controlling includes controlling the start clutch, in a case that the driving automation level is switched to the first driving automation level, so as to change the start clutch from a released state to a half-clutch state when the inter-vehicle distance increases up to a first predetermined value, while in a case that the driving automation level is switched to the second driving automation level, so as to change the start clutch from the released state to the half-clutch state when the inter-vehicle distance increases up to a second predetermined value larger than the first predetermined value.

* * * * *